United States Patent
Sasaki

[11] Patent Number: 6,052,537
[45] Date of Patent: Apr. 18, 2000

[54] CAMERA LENS DRIVING APPARATUS

[75] Inventor: Tadashi Sasaki, Omiya, Japan

[73] Assignee: Fuji Photo Optical Co., Ltd., Saitama, Japan

[21] Appl. No.: 09/257,182

[22] Filed: Feb. 25, 1999

[30] Foreign Application Priority Data

Mar. 2, 1998 [JP] Japan ................................. 10-49834

[51] Int. Cl.$^7$ .............................. G03B 3/00; G03B 13/36
[52] U.S. Cl. .............................................................. 396/103
[58] Field of Search ............................................. 396/103

[56] References Cited

U.S. PATENT DOCUMENTS 4,293,206  10/1981  Tokutomi et al. ..................... 396/103
5,826,117  10/1998  Kawamura et al. .................... 396/103
5,899,586   5/1999  Kawanami ............................ 396/103

FOREIGN PATENT DOCUMENTS 1-129579  5/1989  Japan .

*Primary Examiner*—Russell Adams
*Attorney, Agent, or Firm*—Birch, Stewart, Kolasch & Birch, LLP

[57] ABSTRACT

When a return switch gives an instruction to execute a compulsorily-placing of a focus lens to a preset position, a CPU reads the preset position from a memory and moves the focus lens to the preset position. Then, if a focus demand is operated without canceling the compulsorily-placing, the CPU moves the focus lens while gradually reducing a difference between a position designated by the focus demand and an actual position of the focus lens.

6 Claims, 6 Drawing Sheets

CAMERA LENS DRIVING APPARATUS

BACKGROUND OF THE INVENTION

1. Field of the Invention

The present invention relates generally to a camera lens driving apparatus, and more particularly to a camera lens driving apparatus that is capable of presetting a focus position.

2. Description of Related Art

There is known a conventional lens apparatus for a TV camera, etc. that has a so-called focus presetting function of compulsorily moving or placing a focus lens from an arbitrary position to a previously-set focus position with one touch of a button.

Japanese Patent Provisional Publication No. 1-129579 discloses a TV camera apparatus, to which the focus presetting function is applied.

The conventional lens apparatus with the focus presetting function comprises a presetting switch for presetting a focus position and a return switch for compulsorily placing the focus lens to the preset focus position. If the setting switch is pressed, the present position of the focus lens is set as the preset focus position (which will hereafter be referred to as a preset position). If the return switch is pressed, the focus lens moves automatically from an arbitrary position to the preset position. Then, if the return switch is pressed again or if the focus demand is operated, the compulsorily-placing is cancelled so that the focus lens can move to a position designated by the focus demand.

If the compulsorily-placing is cancelled as stated above, the focus lens automatically moves to the position designated by the focus demand, and hence, the focus cannot be adjusted with respect to the preset position during the compulsorily-placing. For this reason, if the lens is out of focus at the preset position during the compulsorily-placing, the focus must be adjusted by the focus demand after the compulsorily-placing is cancelled. If this operation is performed during the broadcasting, a defocusing image is televised.

In order to solve the above-mentioned problem, it is possible to restart to move the focus lens with respect to the preset position by operating the focus demand after the focus lens is moved to the preset position under the compulsorily-placing. If a potentiometer, etc. determines the rotated amount of the focus demand as an absolute value, however, there is a problem difference between the position designated by the focus demand and the actual position of the focus lens because the focus demand has mechanical rotational ends. More specifically, there is a certain relationship between the rotational position of the focus demand and the position of the focus lens (they are usually proportional to one another), and the rotational ends of the focus demand usually correspond to the movement ends of the focus lens. If the focus demand can restart to move the focus lens from the preset position, a difference at the time of the compulsorily-placing between the position designated by the focus demand and the preset position remains after that. Thus, even if the focus demand is rotated to the rotational end, the focus lens cannot move to the movement end.

SUMMARY OF THE INVENTION

The present invention has been developed in view of the above-described circumstances, and has as its object the provision of a camera lens driving apparatus that moves the focus lens with respect to the preset position by operating the focus demand, and that, if the focus demand has the mechanical rotational ends, prevents differences between the rotational ends of the focus demand and the movement ends of the focus lens.

To achieve the above-mentioned object, the present invention is directed to a camera lens driving apparatus, comprising: a focus designating device comprising a manual control member operated manually for designating a designative position of a focus lens; a focus preset device for designating a preset position as the designative position of the focus lens; and a lens moving device for moving the focus lens to the designative position; wherein, when the manual control member is operated after the lens moving device moves the focus lens to the preset position designated as the designative position by the focus preset device, the lens moving device moves the focus lens from the preset position in accordance with the operation of the manual control member in such a way as to gradually decrease a difference between the designative position of the focus lens designated by the manual control member and an actual position of the focus lens.

Moreover, the camera lens driving apparatus is characterized in that: the manual control member is operated within a limited range; and when the manual control member is operated after the lens moving device moves the focus lens to the preset position designated as the designative position by the focus preset device, the lens moving device moves the focus lens in such a way as to decrease the difference between the designative position of the focus lens designated by the manual control member and the actual position of the focus lens so that the focus lens reaches a movement end upon the manual control member is operated to an end of the range.

According to the present invention, if the manual control member is operated after the focus lens is compulsorily placed to the preset position, the focus lens is moved so that the difference between the designative position of the focus lens designated by the manual control member and the actual position of the focus lens. Thus, if the manual control member is operated after the execution of the compulsorily-placing, the focus lens moves with respect to the preset position in accordance with the operation of the manual control member, and the focus lens reaches to movement ends thereof upon the manual control member reaches operational ends thereof. Consequently, if the lens is out of focus at the preset position, the focus can be adjusted with respect to the preset position without canceling the compulsorily-placing. In addition, there is no disadvantage in that the focus cannot be adjusted in proximity to the movement ends of the focus lens, which results from the difference between the operational ends of the manual control member and the movement ends of the focus lens.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
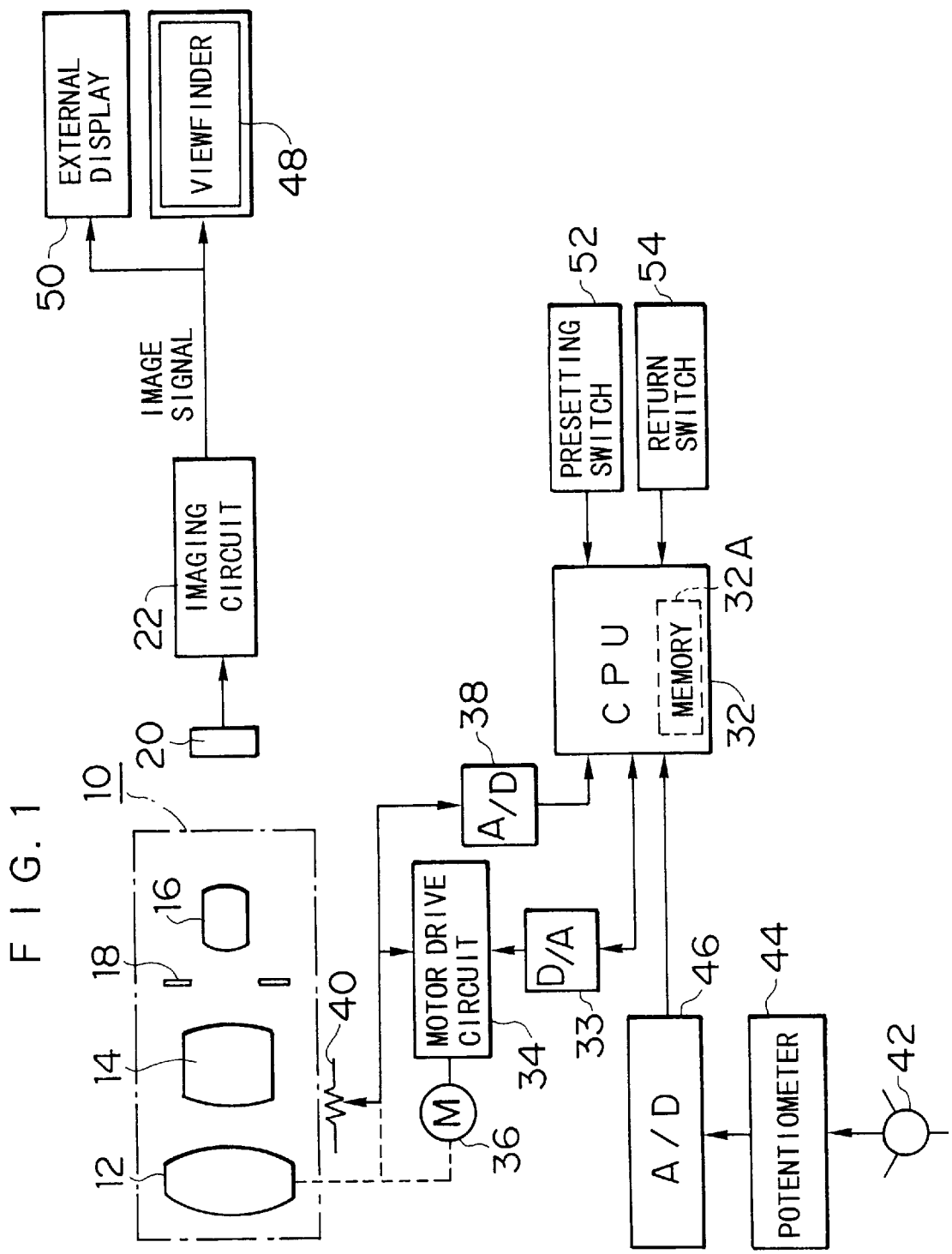
FIG. 1 is a block diagram showing the interior structure of a TV camera to which a camera lens driving apparatus according to an embodiment of the present invention is applied.

FIG. 1 is a block diagram showing the interior structure of a TV camera to which a camera lens driving apparatus according to an embodiment of the present invention is applied. As shown in FIG. 1, a lens optical system 10 comprises a focus lens 12, a variable frame lens 14, a master lens 16 and a diaphragm 18. An image of a subject is formed on an image receiving surface of a charge-coupled device (CCD) 20 through the lenses 12, 14 & 16 and the diaphragm 18. The CCD 20 photoelectrically converts the subject image formed on the image receiving surface thereof into an image signal, which is sent to an imaging circuit 22. The imaging circuit 22 performs a predetermined signal processing for the image signal, which is then converted into, for example, an NTSC video signal. The video signal is sent to a viewfinder 48 and an external display 50 such as a TV monitor. A picture being captured is thus displayed on the viewfinder 48 and the external display 50.

The focus lens 12 of the lens optical system 10 is controlled by a manual control member or a focus demand 42, which is operated manually. A cameraman rotates the focus demand 42, and a potentiometer 44 determines a rotational position of the focus demand 42. An output of the potentiometer 44 is sent to a CPU 32 through an A/D converter 46. The rotational position of the focus demand 42 corresponds to a designative position of the focus lens 12 as described later. The CPU 32 controls the focus lens 12 by converting the rotational position of the focus demand 42 into a value corresponding to a value representing the designative position of the focus lens 12. For this reason, both the rotational position of the focus demand 42 and the converted value are referred to as the focus designative position.

The CPU 32 receives the focus designative position from the focus demand 42 and determines an actual position of the focus lens 12 at present (which will hereafter be referred to as a focus lens position) by a potentiometer 40. An output of the potentiometer 40 is sent to the CPU 32 through an A/D converter 38. Then, the CPU 32 finds a difference between the focus lens position and the focus designative position, and consecutively sends voltage signals as focus control signals to a motor drive circuit 34 through a D/A converter 33 in accordance with the difference.

The motor drive circuit 34 amplifies the voltage of the focus control signals and moves the focus lens 12 by driving a motor 36 so that the difference between the focus lens position and the focus designative position can be 0. Consequently, the focus lens 12 moves to the focus designative position designated by the focus demand 42.

The CPU 32 connects to a presetting switch 52 for presetting a focus position and a return switch 54 for compulsorily moving the focus lens 12 to the preset focus position. The presetting switch 52 and the return switch 54 are arranged, for example, at a control part where the focus demand 42, etc. are provided. When the cameraman presses the presetting switch 52, the CPU 32 determines the present position of the focus lens 12 through the potentiometer 44 and records the determined focus lens position as the preset focus position in a memory 32A of the CPU 32.

Then, when the cameraman presses the return switch 54, the CPU 32 reads the preset position recorded in the memory 32A and moves the focus lens 12 to the preset position. More specifically, when the CPU 32 detects that the return switch 54 has been pressed, the CPU 32 disregards the focus designative position inputted from the focus demand 42 and regards the preset position as the focus designative position. In other words, the CPU 32 finds a difference between the preset position and the focus lens position. The CPU 32 sends the focus control signals to the motor drive circuit 34 through the D/A converter 33 in accordance with the difference. Consequently, the focus lens 12 is compulsorily moved to the preset position from the focus designative position designated by the focus demand 42.

This focus presetting function enables the focus lens 12 to immediately move to the previously-recorded preset position.

When the return switch 54 is pressed again after the focus lens 12 is moved to the preset position by pressing the return switch 54 once, the compulsorily-placing of the focus lens 12 is cancelled and the focus lens 12 returns to the focus designative position of the focus demand 42. The compulsorily-placing may also be cancelled by a special switch.

When the focus demand 42 is operated without canceling the compulsorily-placing after the execution of the compulsorily-placing, the focus lens 12 is moved with respect to the preset position. This will be described in further detail later. If the lens is out of focus at the preset position, the focus is thereby adjusted around the preset position.

Figure 2:
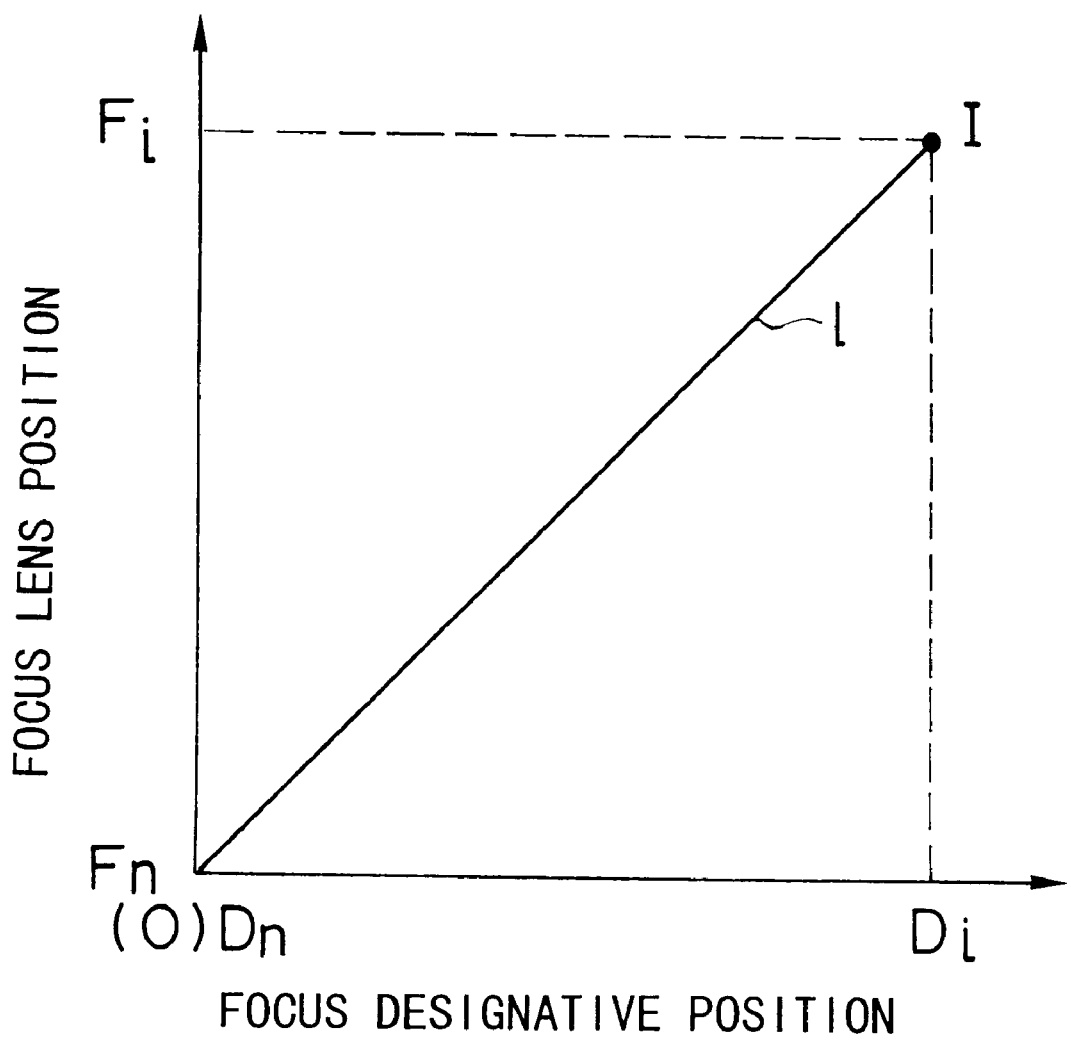
FIG. 2 is a view of assistance in explaining a relation between a designative position of a focus demand and a position of a focus lens.

A description will now be given of the lens drive control by the CPU 32. FIG. 2 is a graph showing a relation between the rotational position of the focus demand 42 (the focus designative position) and the actual position of the focus lens 12 (the focus lens position) before the execution of the compulsorily-placing of the focus lens 12 (not under the compulsorily-placing). As shown in FIG. 2, the focus designative position and the focus lens position are related by a straight line l. If the focus demand 42 is rotated from a rotational end $D_n$ (the origin O) at a nearest end to a rotational end $D_i$ at an infinity end, the focus lens 12 moves from a nearest end $F_n$ (the origin O) to an infinity end $F_i$ along the straight line l within a range from the origin O to the infinity end I. More specifically, the mechanical rotational ends $D_n$ & $D_i$ of the focus demand 42 correspond to the nearest end $F_n$ and the infinity end $F_i$, which are movement ends of the focus lens 12. Rotating the focus demand 42 between the rotational ends causes the focus lens 12 to move between the nearest end $F_n$ and the infinity end $F_i$ by a distance proportional to the amount of rotation.

The CPU 32 recognizes the rotational position of the focus demand 42 as the focus designative position, which is converted into a value corresponding to the position of the focus lens 12. The CPU 32 controls the position of the focus lens 12 so that the position of the focus lens 12 can correspond to the focus designative position, and thus, the slope of the straight line l is 1.

Figure 3:
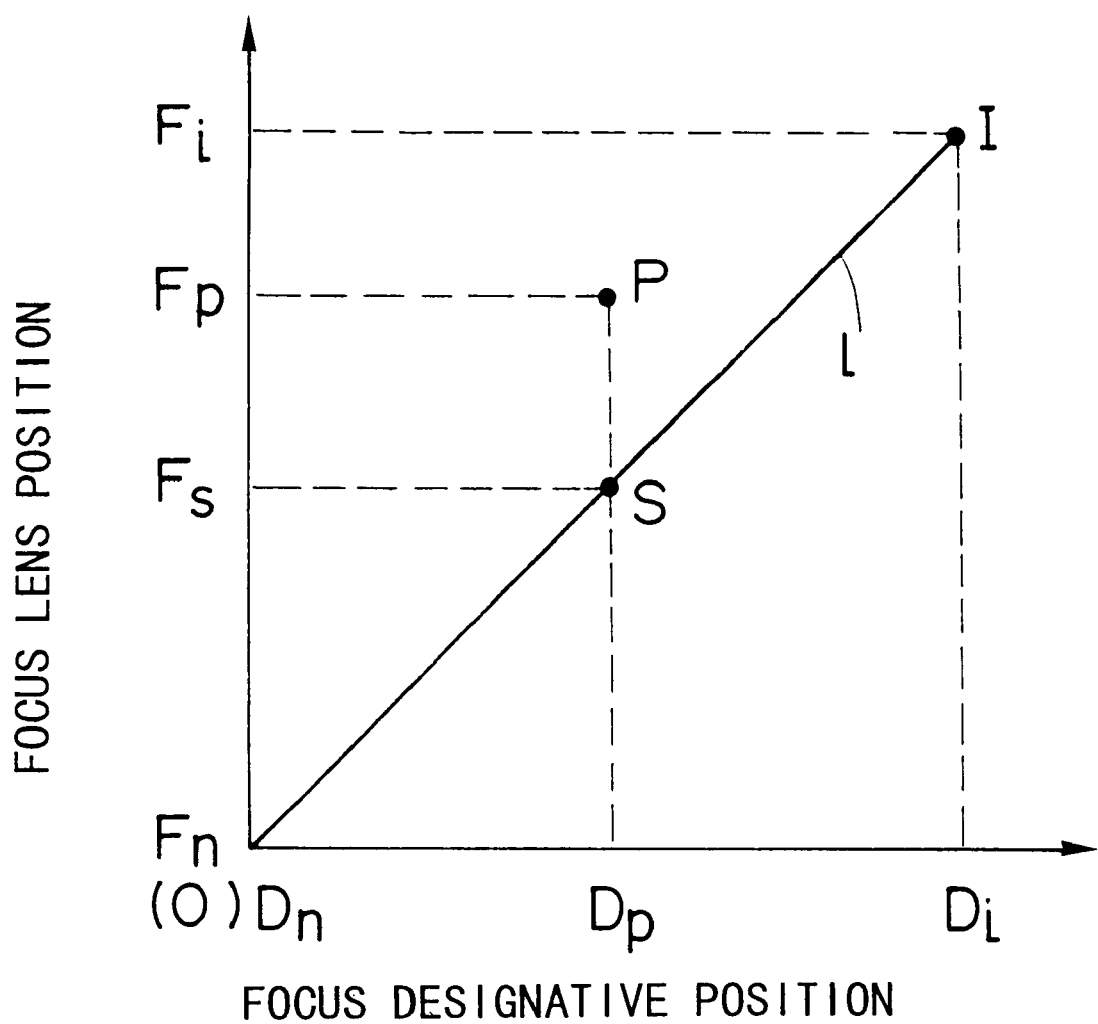
FIG. 3 is a view of assistance in explaining a relation between a designative position of the focus demand and a position of the focus lens.

FIG. 3 shows a relation between the focus designative position and the focus lens position (including the preset position) when the return switch 54 is pressed to execute the compulsorily-placing of the focus lens 12 to the preset position. If the compulsorily-placing is executed at the focus designative position $D_p$ in the case that a position $F_p$ in FIG. 3 of the focus lens 12 is recorded as the preset position in the memory of the CPU 32, the focus lens 12 moves from a position $F_s$ corresponding to a point S on the straight line l to the preset position $F_p$ corresponding to a point P in FIG. 3. Thus, if the compulsorily-placing is executed, the focus designative position and the focus lens position are not related by the straight line 1 any longer.

Figure 4:
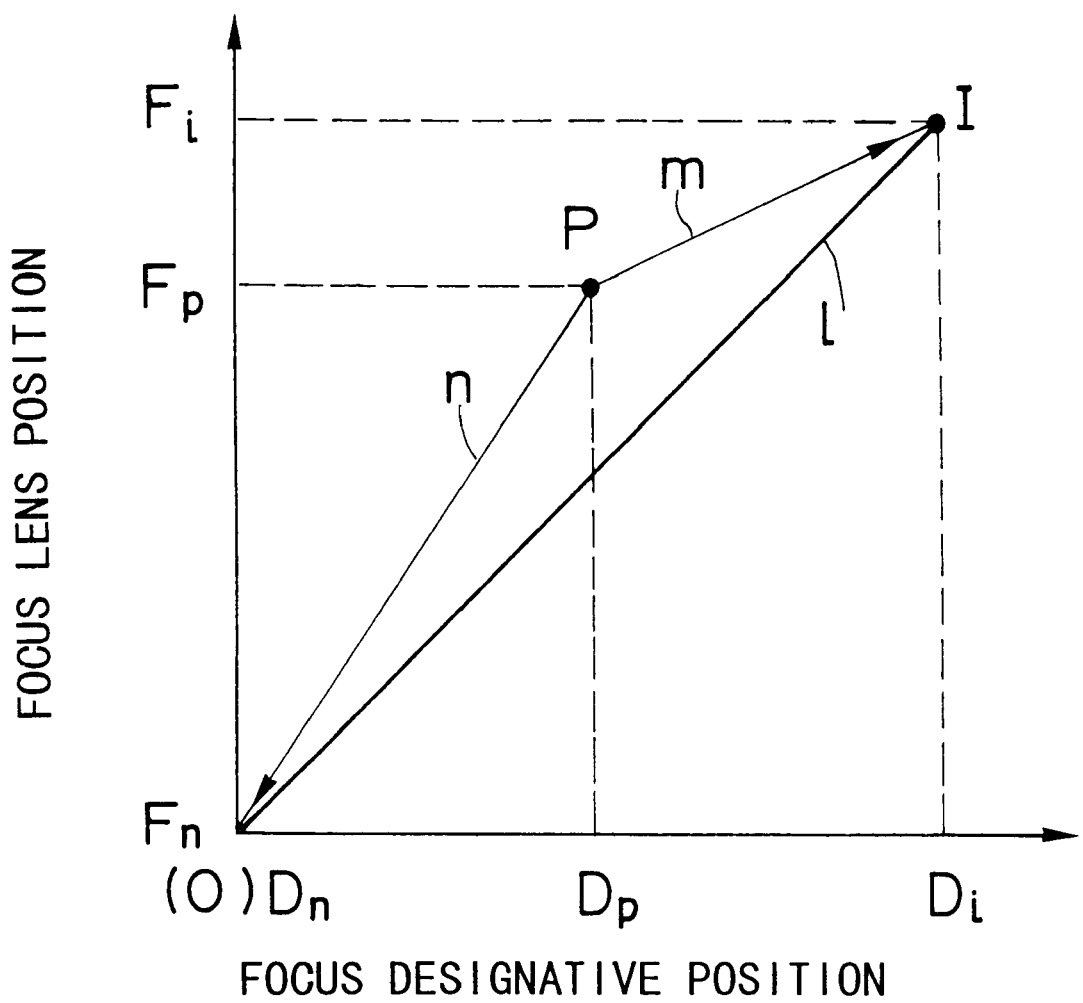
FIG. 4 is a view of assistance in explaining a relation between a designative position of the focus demand and a position of the focus lens.

FIG. 4 shows a relation between the focus designative position and the focus lens position when the focus demand 42 is operated after the execution of the compulsorily-placing of the focus lens 12. As shown in FIG. 4, when the focus demand 42 is operated after the execution of the compulsorily-placing, the CPU 32 moves the focus lens 12 along one of straight lines m and n, which go through the preset position P. If the focus demand 42 is rotated to the near side, the focus lens 12 is moved along the straight line n, which connects the preset position P and the nearest end O. To the contrary, if the focus demand 42 is rotated to the far side, the focus lens 12 is moved along the straight line m, which connects the preset position P and the infinity end I.

Accordingly, if the focus demand 42 is rotated without canceling the compulsorily-placing after the execution of the compulsorily-placing, the focus lens 12 moves from the preset position P. If the focus demand 42 is rotated to the rotational end $D_n$ at the near side or the rotational end $D_i$ at the far side, the focus lens 12 moves to the nearest end $F_n$ or the infinity end $F_i$ without fail.

Figure 5:
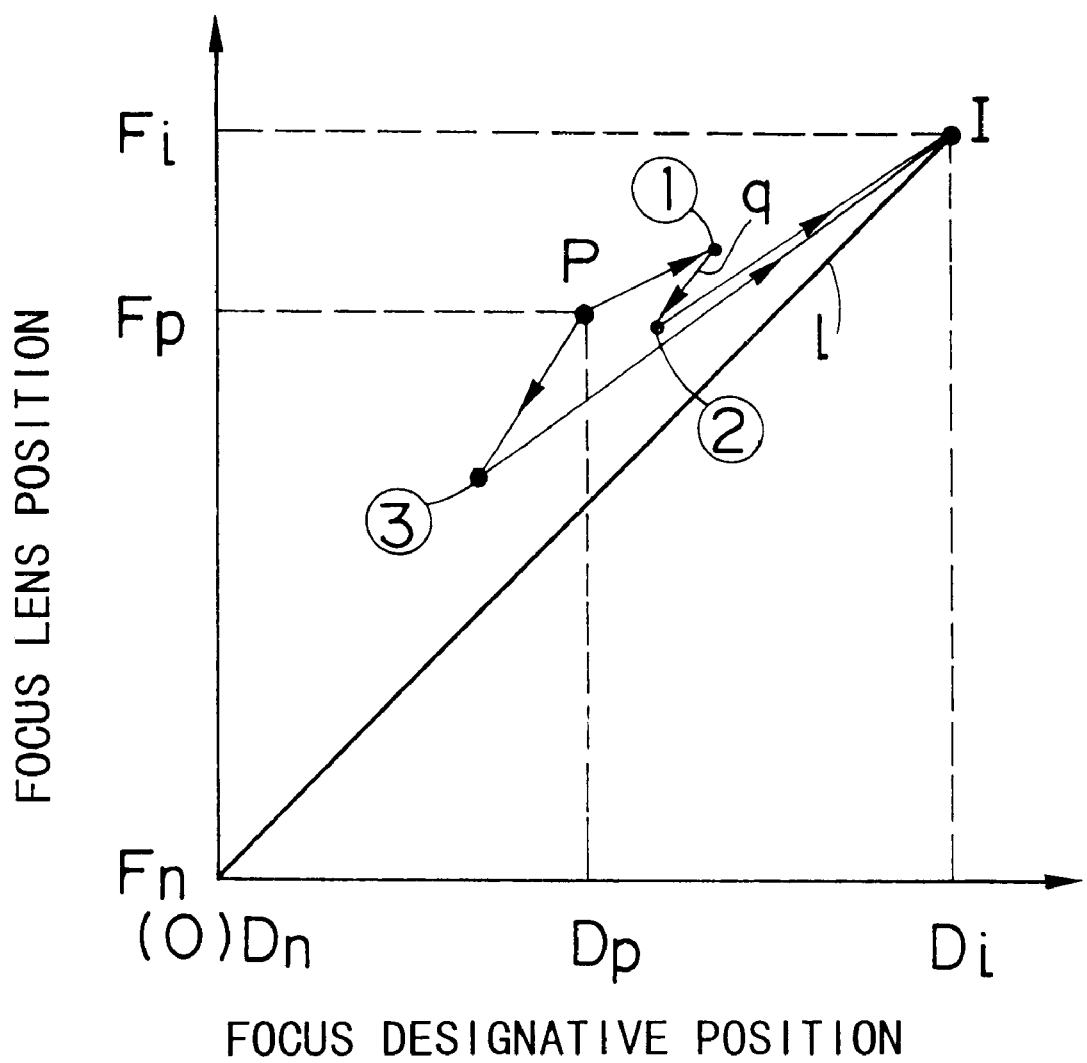
FIG. 5 is a view of assistance in explaining a relation between a designative position of the focus demand and a position of the focus lens.

In FIG. 5, if the rotating direction of the focus demand 42 is switched before the focus demand reaches the rotational end $D_n$ or $D_i$, the CPU 32 moves the focus lens 12 on straight lines that connect switching points ①–③ and the movement ends of the focus lens 12. For example, if the rotating direction of the focus demand 42 is switched from the far side to the near side at the point ①, the focus lens 12 moves along a straight line q, which connects the point ① and the nearest end O.

In order to control the driving of the focus lens 12 as shown in FIGS. 4 and 5, the CPU 32 converts the focus designative position $X_1$ into $X_1'$ by the following equation (1) every time the focus designative position inputted from the focus demand 42 changes by a predetermined unit amount after the execution of the compulsorily-placing:

$$X_1' = \frac{(A_0 - B_0)}{(A_0 - X_0)} \times (X_1 - X_0) + B_0 \quad (1)$$

where $X_0$ is the focus designative position before the change of the focus designative position inputted from the focus demand 42, $X_1$ is the focus designative position after the change, $A_0$ is one of the movement ends of the focus lens 12 in the moving direction (the nearest end $F_n$ or the infinity end $F_i$), and $B_0$ is a position of the focus lens 12 (a focus lens position) when the focus designative position is $X_0$. Then, the CPU 32 generates a focus control signal in accordance with the focus designative position $X_1'$ after the conversion, and sends the focus control signal to the motor drive circuit 34. This moves the focus lens 12 to the focus designative position $X_1'$.

As stated above, every time the focus designative position inputted from the focus demand 42 changes by the predetermined unit amount, the focus designative position is converted by the above equation (1) and the focus lens 12 is moved to the focus designative position after the conversion. Accordingly, as shown in FIGS. 4 & 5, the focus lens 12 can be moved with respect to the preset position P, and the rotational ends of the focus demand 42 can correspond to the movement ends of the focus lens 12 without fail.

Figure 6:
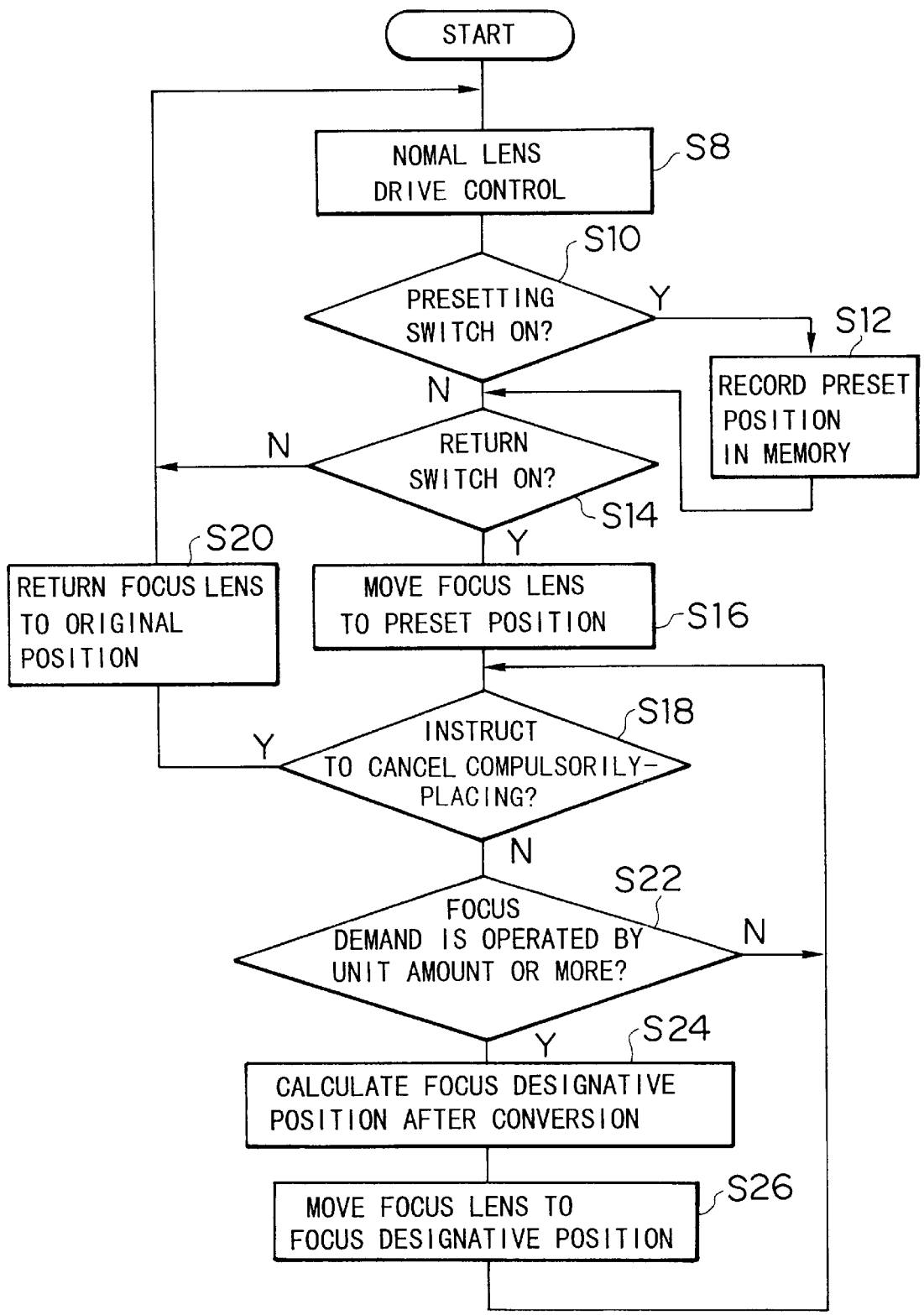
FIG. 6 is a flowchart showing the operation of the camera lens driving apparatus.

A description will now be given of the operation of the camera lens driving apparatus with reference to the flowchart of FIG. 6. When the power is turned on, the CPU 32 controls the driving of the lens in a usual way (S8). More specifically, the focus lens 12 is moved to the focus designative position that is inputted from the focus demand 42 as shown in FIG. 2. Then, the CPU 32 determines whether the presetting switch 52 is turned on while controlling the driving of the lens (S10). If the presetting switch 52 is turned on, the present position of the focus lens 12 is recorded as the preset position in the memory 32A of the CPU 32 (S12). Accordingly, the cameraman operates the focus demand 42 to position the focus lens 12 at a desired position, and presses the presetting switch 52 to record the desired position as the preset position in the memory 32A.

Then, the CPU 32 determines whether the return switch 54 is turned on (S14). If the return switch 54 is not turned on, the CPU 32 repeats the procedure from S8 to drive the focus lens 12 in a normal way.

On the other hand, if the return switch 54 is turned on at S14, the CPU 32 reads the preset position from the memory 32A, and moves the focus lens 12 to the preset position (S16). Accordingly, the cameraman can immediately move the focus lens 12 to the preset position by pressing the return switch 54.

Then, the CPU 32 determines whether the return switch 54 is turned on again to give an instruction to cancel the compulsorily-placing (S18). If the instruction is given to cancel the compulsorily-placing, the CPU 32 moves the focus lens 12 to the focus designative position inputted from the focus demand 42 (S20), and start the procedure at S8.

On the other hand, if no instruction is given to cancel the compulsorily-placing, the CPU 32 determines whether the focus demand 42 is operated by a predetermined unit amount or more (S22). If the focus demand 42 is operated by a smaller amount than the predetermined unit amount, the CPU 32 repeats the procedure at S18.

If the focus demand 42 is operated by the predetermined unit amount at S22, the CPU 32 calculates a focus designative position $X_1'$ by the above equation (1) in which the focus designative position of the focus demand 42 is $X_0$, the position of the movement end of the focus lens 12 in the rotating direction of the focus demand 42 is $A_0$, the preset position is $B_0$, and the focus designative position of the focus demand 42 when the focus demand 42 is operated by the unit amount after the execution of the compulsorily-placing is $X_1$ (S24). Then, the CPU 32 moves the focus lens 12 to the focus designative position $X_1'$ (S26) and returns to S18.

If the focus demand 42 is operated continuously, the CPU 32 repeats the processing from S22 to S26 and sequentially updates $X_0$, $B_0$ and $X_1$ in the above equation (1) to calculate the focus designative position $X_1'$ after the conversion. The CPU 32 moves the focus lens 12 to the calculated focus designative position $X_1'$. The focus lens position Bo and the focus designative position $X_0$ are sequentially updated to the previous focus designative position $X_1'$ and the previous focus designative position $X_1$, respectively.

Accordingly, the cameraman can move the focus lens 12 from the preset position by operating the focus demand 42 without canceling consciously the compulsorily-placing after the execution of the compulsorily-placing. If the lens is out of focus at the preset position, the focus is adjusted with respect to the preset position. When the focus lens 12 is moved with respect to the preset position, the movement distance of the focus lens 12 is controlled with respect to the rotational amount of the focus demand 42 so that the rotational ends of the focus demand 42 can correspond to the movement ends of the focus lens 12. For this reason, the subject can be focused even in proximity to the movement ends of the focus lens 12.

Moreover, even if the compulsorily-placing of the focus lens 12 is not cancelled consciously after the execution of the compulsorily-placing, the focus lens 12 gradually comes to move along the straight line 1 in FIG. 2 while the focus demand 42 is operated. Thus, the focus lens 12 can naturally return to the normal lens drive control state without causing the unnatural displacement of the focus when the compulsorily-placing is cancelled.

In this embodiment, if the focus demand 42 is operated after the execution of the compulsorily-placing of the focus lens 12, the focus lens 12 is moved on the straight line with a predetermined slope so that the rotational ends of the focus demand 42 can correspond to the movement ends of the focus lens 12 as shown in FIGS. 4 and 5. The present invention, however, should not be restricted to this. The focus lens 12 may be moved along a straight line with such a slope that the focus lens 12 can reach a point on the straight line 1 before the focus demand 42 reaches the rotational end thereof. After the focus lens 12 reaches the point on the straight line 1, the focus lens 12 is moved along the straight line 1.

As set forth hereinabove, according to the camera lens driving apparatus of the present invention, if the manual control member is operated after the focus lens reaches the preset position as a result of the compulsorily-placing, the focus lens is moved so that the difference between the designative position of the focus lens designated by the manual control member and the actual position of the focus lens can be decreased gradually. For this reason, if the manual control member is operated after the execution of the compulsorily-placing, the focus lens moves in accordance with the operation of the manual control member, and the focus lens reaches the movement end thereof upon the manual control member reaches the operational end thereof. Thus, if the lens is out of focus at the preset position, the focus can be adjusted with respect to the preset position without canceling the compulsorily-placing. In addition, there is no disadvantage in that the focus cannot be adjusted in proximity to the movement ends of the focus lens, because the operational ends of the manual control member can correspond to the movement ends of the focus lens.

Moreover, the focus lens gradually returns to the normal control state without canceling the compulsorily-placing as in the past, and there is no abrupt change in the focus during the broadcasting since the compulsorily-placing is not cancelled.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera lens driving apparatus, comprising:
    a focus designating device comprising a manual control member operated manually for designating a designative position of a focus lens;
    a focus preset device for designating a preset position as the designative position of the focus lens; and
    a lens moving device for moving the focus lens to the designative position;
    wherein, when the manual control member is operated after the lens moving device moves the focus lens to the preset position designated as the designative position by the focus preset device, the lens moving device moves the focus lens from the preset position in accordance with the operation of the manual control member in such a way as to gradually decrease a difference between the designative position of the focus lens designated by the manual control member and an actual position of the focus lens.

2. The camera lens driving apparatus as defined in claim 1, wherein, when the manual control member is operated after the lens moving device moves the focus lens to the preset position designated as the designative position by the focus preset device, the lens moving device moves the focus lens in such a way as to decrease the difference between the designative position of the focus lens designated by the manual control member and the actual position of the focus lens in proportion to an operated amount of the manual control member.

3. The camera lens driving apparatus as defined in claim 1, wherein the focus designating device further comprises a potentiometer for determining an operated amount of the manual control member.

4. The camera lens driving apparatus as defined in claim 1, wherein:
    the manual control member is operated within a limited range; and
    when the manual control member is operated after the lens moving device moves the focus lens to the preset position designated as the designative position by the focus preset device, the lens moving device moves the focus lens in such a way as to decrease the difference between the designative position of the focus lens designated by the manual control member and the actual position of the focus lens so that the focus lens reaches a movement end upon the manual control member is operated to an end of the range.

5. The camera lens driving apparatus as defined in claim 4, wherein, when the manual control member is operated after the lens moving device moves the focus lens to the preset position designated as the designative position by the focus preset device, the lens moving device moves the focus lens in such a way as to decrease the difference between the designative position of the focus lens designated by the manual control member and the actual position of the focus lens in proportion to an operated amount of the manual control member.

6. The camera lens driving apparatus as defined in claim 4, wherein the focus designating device further comprises a potentiometer for determining an operated amount of the manual control member.

* * * * *